US005948158A

United States Patent [19]

Fenger

[11] Patent Number: 5,948,158

[45] Date of Patent: Sep. 7, 1999

[54] APPARATUS AND METHOD FOR PRODUCING CLINKER FROM A HYDROUS SLURRY OF RAW MATERIALS

[75] Inventor: Jens Fenger, Valby, Denmark

[73] Assignee: F.L. Smidth & Co. A/S, Denmark

[21] Appl. No.: 08/945,601

[22] PCT Filed: Aug. 3, 1995

[86] PCT No.: PCT/DK95/00320

§ 371 Date: Oct. 28, 1997

§ 102(e) Date: Oct. 28, 1997

[87] PCT Pub. No.: WO97/06115

PCT Pub. Date: Feb. 20, 1997

[51] Int. Cl.[6] .......... C04B 7/43

[52] U.S. Cl. .......... 106/739; 106/752

[58] Field of Search .......... 106/739, 752

[56] References Cited

U.S. PATENT DOCUMENTS 3,839,058 10/1974 Sylvest .

3,923,536 12/1975 Kobayashi .......... 106/752

3,986,886 10/1976 Sylvest .

4,080,218 3/1978 Mori et al. .......... 106/752

4,226,585 10/1980 Deussner .......... 432/106

4,248,641 2/1981 Deussner .

5,012,751 5/1991 Kirlin .......... 110/346

5,173,044 12/1992 Neilsen .......... 432/14

5,437,721 8/1995 Kupper et al. .......... 106/752

*Primary Examiner*—Paul Marcantoni

*Attorney, Agent, or Firm*—Baker & Botts, L.L.P.

[57] ABSTRACT

The invention relates to an apparatus and a method for manufacturing clinker, such as cement clinker, in which the majority of the raw materials is present in a hydrous slurry.

Initially, the slurry is dried in a gas suspension drier, and the raw materials are subsequently passed to a thermal unit in which the heating of the raw material is effected fairly quickly so that all organic compounds are destroyed in the thermal unit.

Subsequent to being heated in the thermal unit, the raw material is directed to the kiln in which it is nodulized and burned into clinker.

4 Claims, 1 Drawing Sheet

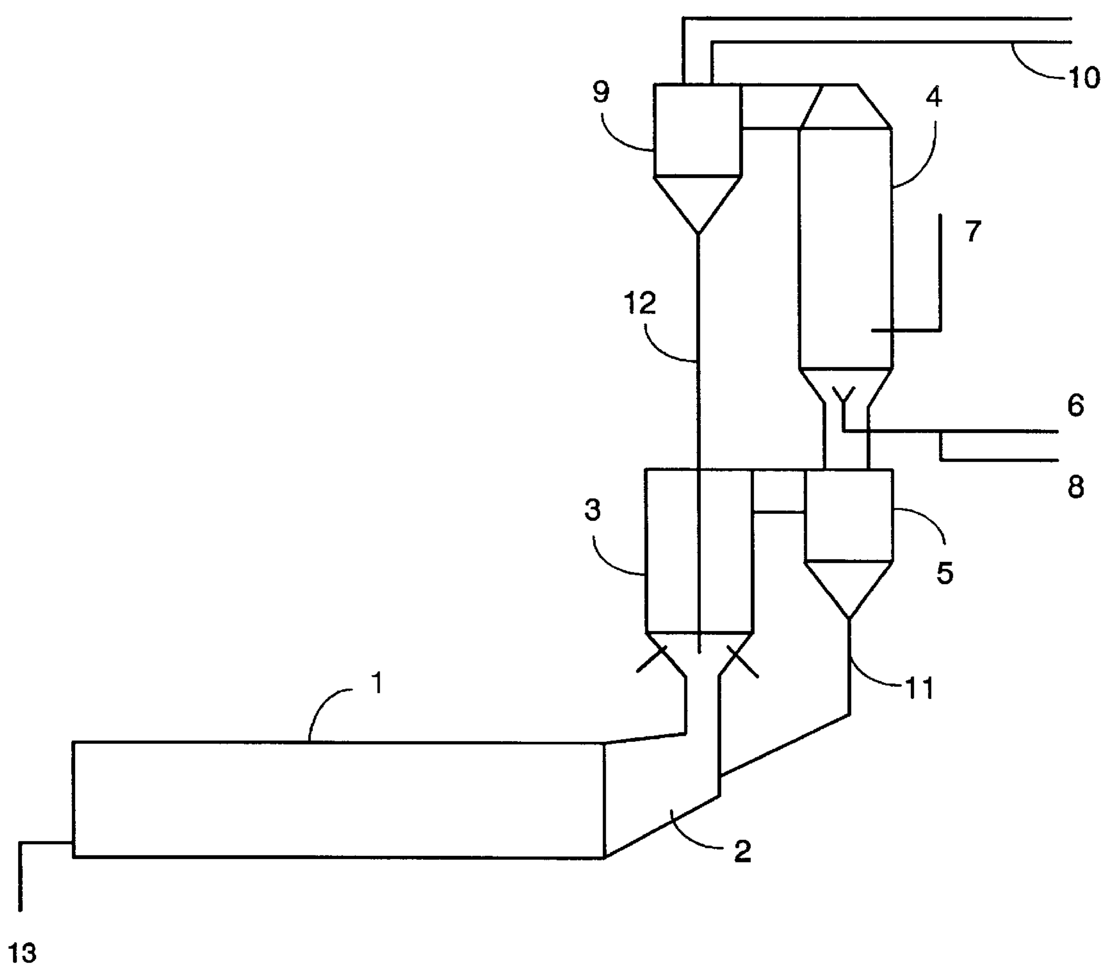
10
9
4
7
12
6
8
3
5
1
11
2
13

APPARATUS AND METHOD FOR PRODUCING CLINKER FROM A HYDROUS SLURRY OF RAW MATERIALS

BACKGROUND OF THE INVENTION

This application is a 371 of PCT/DK95/00320 filed Aug. 3, 1995.

The present invention relates to an apparatus and a method for manufacturing clinker whereby the majority of the raw materials is introduced in a hydrous slurry. The apparatus comprises a gas suspension drier in which the slurry of raw materials is dried and a kiln in which the materials are burned and nodulized.

In connection with the traditional method for manufacturing cement clinker according to a wet process, the raw materials are ground subject to simultaneous addition of water and passed on to the kiln in a slurry so that the drying of the slurry is effected in the first and coldest part of the kiln.

Another possibility involves removal of the water from the raw materials prior to their entry into the kiln. Such a method is described in U.S. Pat. No. 5,173,044 according to which the raw materials are fed to a Gas Suspension Drier (GSD) prior to their entry into the kiln. In this context, the GSD unit is also operating as a scrubber, and, consequently, nearly all of the $S0_2$ being generated in the kiln is expelled from the exhaust gasses. In this apparatus it is also possible to mix dry and hydrous raw materials in the GSD unit without causing the overall raw material mixture to become inhomogeneous.

However, it has emerged that the temperature profiles experienced during this process will increase the risk of volatile organic compounds being distilled off the raw materials in the first part of the kiln so that they are carried along by the exhaust gases through the GSD unit without being absorbed or destroyed since the temperature in the GSD unit is relatively low.

SUMMARY OF THE INVENTION

It is therefore the object of the invention-to provide a method for manufacturing clinker by means of which emission to the atmosphere of volatile organic compounds entrained in the exhaust gases is avoided.

This object is achieved by leading the exhaust gases from the kiln through a thermal unit in which the temperature is momentarily increased to a level which is sufficiently high for the volatile organic compounds to be destroyed.

The raw materials have a temperature of approximately 120–200° C., on discharge from the GSD unit and in connection with the manufacture of cement clinker this temperature must momentarily be raised beyond 750° C.

When manufacturing cement clinker, it may thus be advantageous to feed the raw materials to a calciner in which the temperature normally is above 800–900° C.

BRIEF DESCRIPTION OF THE DRAWINGS

The FIGURE is a schematic of plant according to the present invention.

DESCRIPTION OF THE PREFERRED EMBODIMENTS

Illustrated in the FIGURE is a cement kiln plant which comprises a rotary kiln 1, a gas suspension drier (GSD) 4 with a subsequent separation cyclone 9, and a calciner 3 with a subsequent separation cyclone 5. A raw material slurry is fed to the GSD unit via a duct 6 and air for atomizing the slurry is introduced via a duct 8, dry raw materials may be fed via a duct 7.

Manufacturing of cement in an apparatus of the aforementioned kind is done by the raw material slurry being fed to the GSD unit via the duct 6 and atomized in a nozzle in the GSD unit by means of compressed air. Hot exhaust gases from the kiln are also fed to the GSD unit so as to ensure that the temperature in the GSD unit is increased to a level near 150° C. Subsequent to being dried in the GSD unit, the gas/material slurry passes into the separation cyclone 9 where the exhaust gases are separated from the dried raw material and passed on to a not shown filter for dedusting via a duct 10. The dried raw material is routed via a duct 12 to the calciner 3 in which it is momentarily heated to a level near 800° C. Hot exhaust gases from the kiln are fed to the calciner which also receives fuel via two burners which are located in the lower part of the calciner. Subsequent to calcination, the raw material passes to the separation cyclone 5 from which the exhaust gases are diverted to the GSD unit and the calcined material is conducted via a duct 11 down to the kiln inlet 2 in the rotary kiln 1.

In case the material has not passed a separate thermal unit prior to its entry into the kiln, the temperature of the material will rise from around 150° C. from the outlet the GSD unit to 800° C. in the first part of the kiln before the material reaches the final temperature of around 1500° C. in the hottest part of the kiln.

The relatively slow temperature rise will cause organic compounds to be distilled off the raw materials in the kiln and in the kiln inlet while the raw materials are subjected to temperatures ranging from less than 200° C. up to a level close to 750° C., and the temperature in the GSD unit will not be sufficiently high to ensure subsequent destruction of these compounds.

If an apparatus according to claim 1 is used the temperature in the kiln inlet is approximately 800–900° C. Organic compounds released in the thermal unit will be burned and hereby destroyed immediately. As all the exhaust gasses from the kiln passes through the thermal unit also organic compounds which are released after the thermal unit when the raw material mixture has passed into the kiln, will be destroyed because the exhaust gasses passes through the thermal unit.

I claim:

1. An apparatus for manufacturing cement clinker in which the majority of the raw materials is introduced in a hydrous slurry, said apparatus comprising a gas suspension drier in which the slurry of raw materials is dried and heated to a temperature below 200° C., a kiln in which the materials are burned and nodulized, and a thermal unit located between the gas suspension drier and the kiln, and wherein the raw material is led through the thermal unit and the thermal unit is supplied with fuel in order to momentarily increase the temperature of the raw material to more than 750° C.

2. An apparatus according to claim 1, wherein the thermal unit is a calciner in which the temperature exceeds 800° C.

3. A method for manufacturing cement clinker comprising introducing a majority of raw materials in a slurry, feeding the hydrous slurry of raw materials to a gas suspension drier for drying and heating to a temperature below 200° C., and thereafter supplying the dried raw material to a thermal unit and then in a kiln, and further comprising momentarily heating the dried raw material to a temperature above 750° C. prior to its entry into the kiln.

4. A method according to claim 3, wherein the raw material, after being dried in the gas suspension drier and prior to its entry into the kiln, is introduced to a calciner in which it is heated to a temperature within the range 800–900° C.

* * * * *